US012779348B1

(12) United States Patent
Register et al.

(10) Patent No.: US 12,779,348 B1
(45) Date of Patent: Nov. 3, 2026

(54) COMPUTING DEVICE FOR PROVIDING AN ONLINE FANTASY SPORTS GAME WITH MULTIPLE SPORTS AND RELATED METHODS

(71) Applicant: Ultimate Fantasy Holdings Inc., Orlando, FL (US)

(72) Inventors: John G. Register, Oviedo, FL (US); Daniel E. Baker, Orlando, FL (US)

(73) Assignee: ULTIMATE FANTASY HOLDINGS INC., Orlando, FL (US)

( * ) Notice: Subject to any disclaimer, the term of this patent is extended or adjusted under 35 U.S.C. 154(b) by 0 days.

(21) Appl. No.: 19/395,135

(22) Filed: Nov. 20, 2025

Related U.S. Application Data

(60) Provisional application No. 63/872,967, filed on Aug. 29, 2025.

(51) Int. Cl.
*A63F 13/828* (2014.01)
*A63F 13/537* (2014.01)

(52) U.S. Cl.
CPC .......... *A63F 13/828* (2014.09); *A63F 13/537* (2014.09)

(58) Field of Classification Search
CPC .. A63F 13/828; A63F 13/537; G07F 17/3288; G07F 17/3276; G06Q 50/34
See application file for complete search history.

(56) References Cited

U.S. PATENT DOCUMENTS

| | | | | |
|---|---|---|---|---|
| 8,176,518 | B1 * | 5/2012 | Junkin | A63F 13/46 725/9 |
| 8,538,563 | B1 | 9/2013 | Barber | |
| 8,647,201 | B1 * | 2/2014 | Jehamy | A63F 13/65 463/31 |
| 8,840,468 | B1 * | 9/2014 | Jehamy | A63F 13/795 463/31 |
| 9,358,469 | B1 | 6/2016 | Nicholas et al. | |
| 11,501,611 | B1 * | 11/2022 | Malvagna | G06F 3/0482 |
| 11,710,382 | B1 * | 7/2023 | Malvagna | G07F 17/3244 463/31 |
| 11,850,524 | B2 | 12/2023 | Thormann | |
| 2006/0136297 | A1 * | 6/2006 | Willis | G07F 17/32 705/14.58 |
| 2007/0021214 | A1 * | 1/2007 | Ma | A63F 13/65 463/42 |

(Continued)

FOREIGN PATENT DOCUMENTS

WO WO2014110364 2/2015

*Primary Examiner* — Ankit B Doshi
(74) *Attorney, Agent, or Firm* — Allen, Dyer, Doppelt + Gilchrist, PA

(57) ABSTRACT

A computing device is for providing an online fantasy sports game for users. The computing device includes a processor and memory configured to provide a gaming UI for the users to play the online fantasy sports game. The online fantasy sports game operates based upon multiple sports. The processor is also configured to receive respective game instructions from each user for each of the multiple sports, provide each user with an offer to add a wildcard gaming event into the online fantasy sports game, generate an aggregate score for each user based upon the respective game instructions and associated actual performance in the sports and the wildcard gaming event, and determine a winner of the online fantasy sports game from the users and based upon the aggregate scores of the users.

16 Claims, 9 Drawing Sheets

123

(56) References Cited

U.S. PATENT DOCUMENTS

| | | | | |
|---|---|---|---|---|
| 2008/0161113 | A1* | 7/2008 | Hansen | A63F 13/335 463/42 |
| 2010/0184495 | A1* | 7/2010 | Levy | A63F 13/828 463/43 |
| 2010/0279754 | A1* | 11/2010 | Tanenbaum | G06Q 50/34 463/3 |
| 2012/0316659 | A1* | 12/2012 | Magas | A63F 13/828 700/91 |
| 2013/0079073 | A1* | 3/2013 | Sharifi | A63F 13/45 463/3 |
| 2013/0222597 | A1* | 8/2013 | Brink | H04N 21/4781 348/157 |
| 2014/0274324 | A1* | 9/2014 | Grant | G07F 17/3288 463/25 |
| 2018/0126285 | A1* | 5/2018 | Kehoe | A63F 13/30 |
| 2018/0345149 | A1* | 12/2018 | Farudi | A63B 71/0622 |

* cited by examiner

COMPUTING DEVICE FOR PROVIDING AN ONLINE FANTASY SPORTS GAME WITH MULTIPLE SPORTS AND RELATED METHODS

RELATED APPLICATION

This application is based upon prior filed copending Application No. 63/872,967 filed Aug. 29, 2025, the entire subject matter of which is incorporated herein by reference in its entirety.

TECHNICAL FIELD

The present disclosure relates to the field of gaming, and, more particularly, to a fantasy sports game and related methods.

BACKGROUND

Online gaming has become a robust and pervasive industry in the United States. Indeed, even before the recent widespread legalization of online gambling, recreational fantasy sports was popular and had lasting appeal across several sports. Notwithstanding the popularity of fantasy sports, there are some drawbacks. One common drawback is user engagement deterioration. For example, many fantasy sports games are tied to professional sports seasons and last several months. If a given user's performance is poor, their chances for success become remote and the engagement of the given user may be reduced. If a substantial number of users lose engagement in the game, the overall quality of the competition may be reduced.

SUMMARY

Generally, a computing device is for providing an online fantasy sports game for a plurality of users. The computing device comprises a processor and memory cooperating therewith and configured to provide a gaming user interface (UI) for the plurality of users to play the online fantasy sports game. The online fantasy sports game operates based upon a plurality of sports. The processor is configured to receive respective game instructions from each user for each of the plurality of sports. The processor is further configured to provide each user with an offer to add at least one wildcard gaming event into the online fantasy sports game, generate an aggregate score for each user based upon the respective game instructions and associated actual performance in the plurality of sports and the at least one wildcard gaming event, and determine a winner of the online fantasy sports game from the plurality of users and based upon the aggregate scores of the plurality of users.

In some embodiments, the processor may be configured to receive geolocation data from each user, and offer to add the at least one wildcard gaming event into the online fantasy sports game based upon the geolocation data for each user. The user devices are geographically remote from each other. The processor may be configured to offer to add the at least one wildcard gaming event into the online fantasy sports game when the geolocation data for each user is within a threshold distance of the at least one wildcard gaming event. Also, the at least one wildcard gaming event may comprise a one-off gaming event. The processor may be configured to, for the offer, receive an associated wildcard risk wager from a current aggregate score for a given user.

Additionally, the processor may be configured to pseudo randomly provide each user with the offer to add at least one wildcard gaming event into the online fantasy sports game. The processor may be configured to provide each user with the offer to add an additional wildcard gaming event when a current aggregate score for a given user is below a threshold value. The processor may be configured to provide each user with the offer to add an additional wildcard gaming event based upon an additional fee from a given user.

The respective game instructions may comprise respective rosters for each of the plurality of sports. The processor may be configured to generate a plurality of draft events respectively for the plurality of sports, the plurality of draft events to determine rosters for each of the plurality of users. For example, the plurality of sports may comprise professional American football, soccer, professional basketball, professional baseball, horse racing, professional golf, and professional hockey.

Another aspect is directed to a computer implemented method for providing an online fantasy sports game for a plurality of users. The method includes providing a gaming UI for the plurality of users to play the online fantasy sports game. The online fantasy sports game operates based upon a plurality of sports. The method also includes receiving respective game instructions from each user for each of the plurality of sports, providing each user with an offer to add at least one wildcard gaming event into the online fantasy sports game, and generating an aggregate score for each user based upon the respective game instructions and associated actual performance in the plurality of sports and the at least one wildcard gaming event. The method further includes determining a winner of the online fantasy sports game from the plurality of users and based upon the aggregate scores of the plurality of users.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Figure 1:
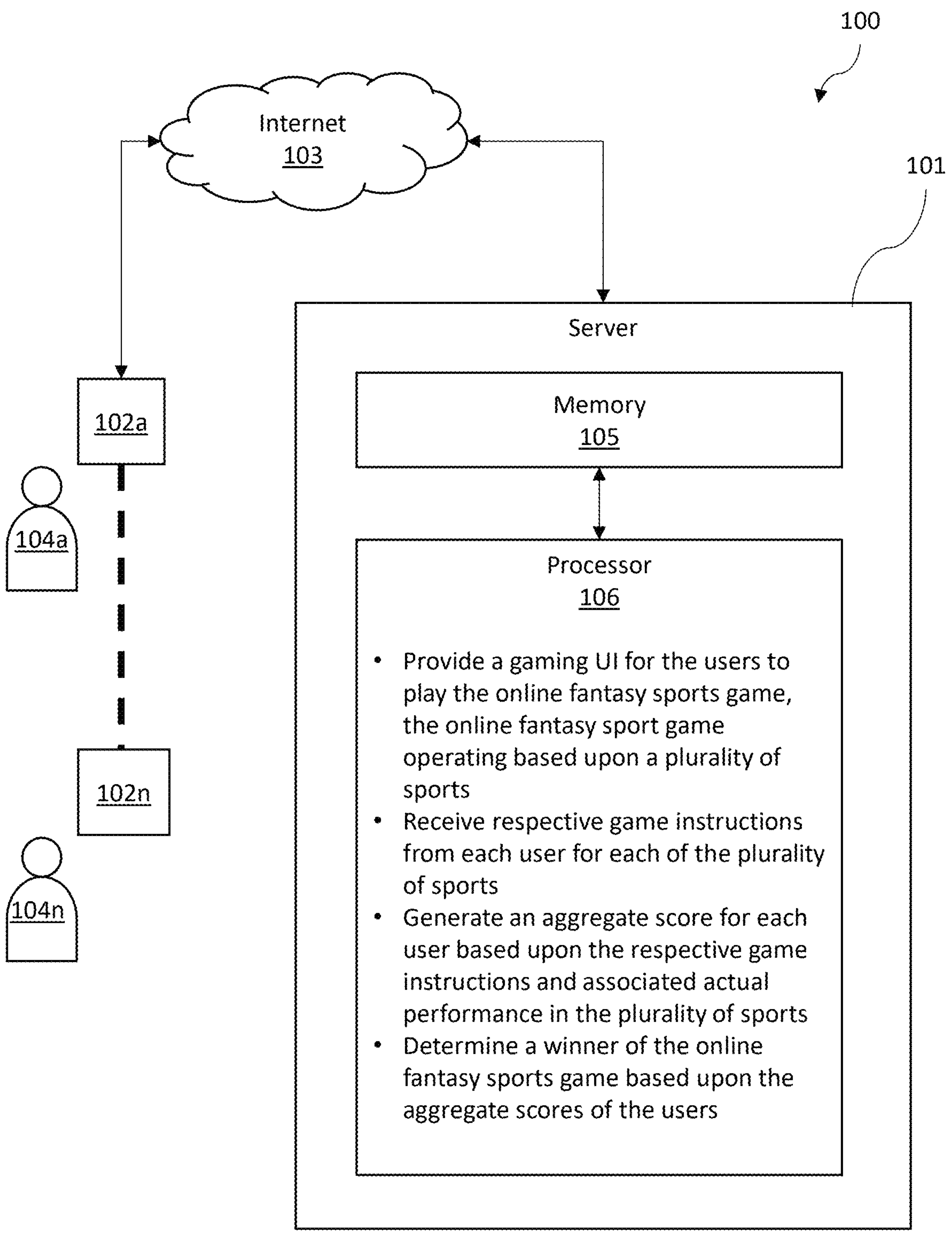
FIG. 1 is a schematic diagram of a system, according to an example embodiment of the present disclosure.
Figure 2A:
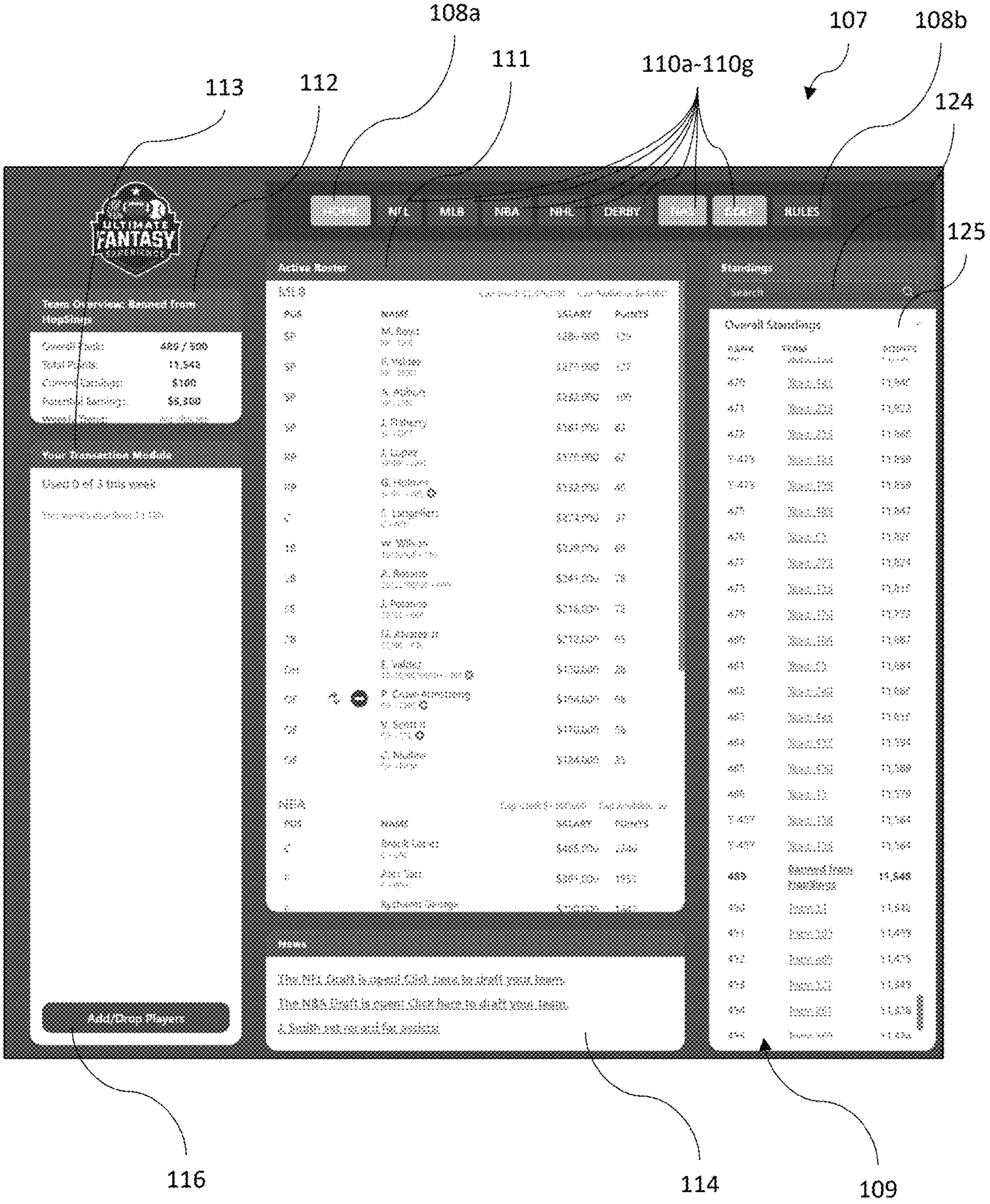
FIGS. 2A-2H are screenshots from a gaming UI from the system of FIG. 1.
Figure 2B:
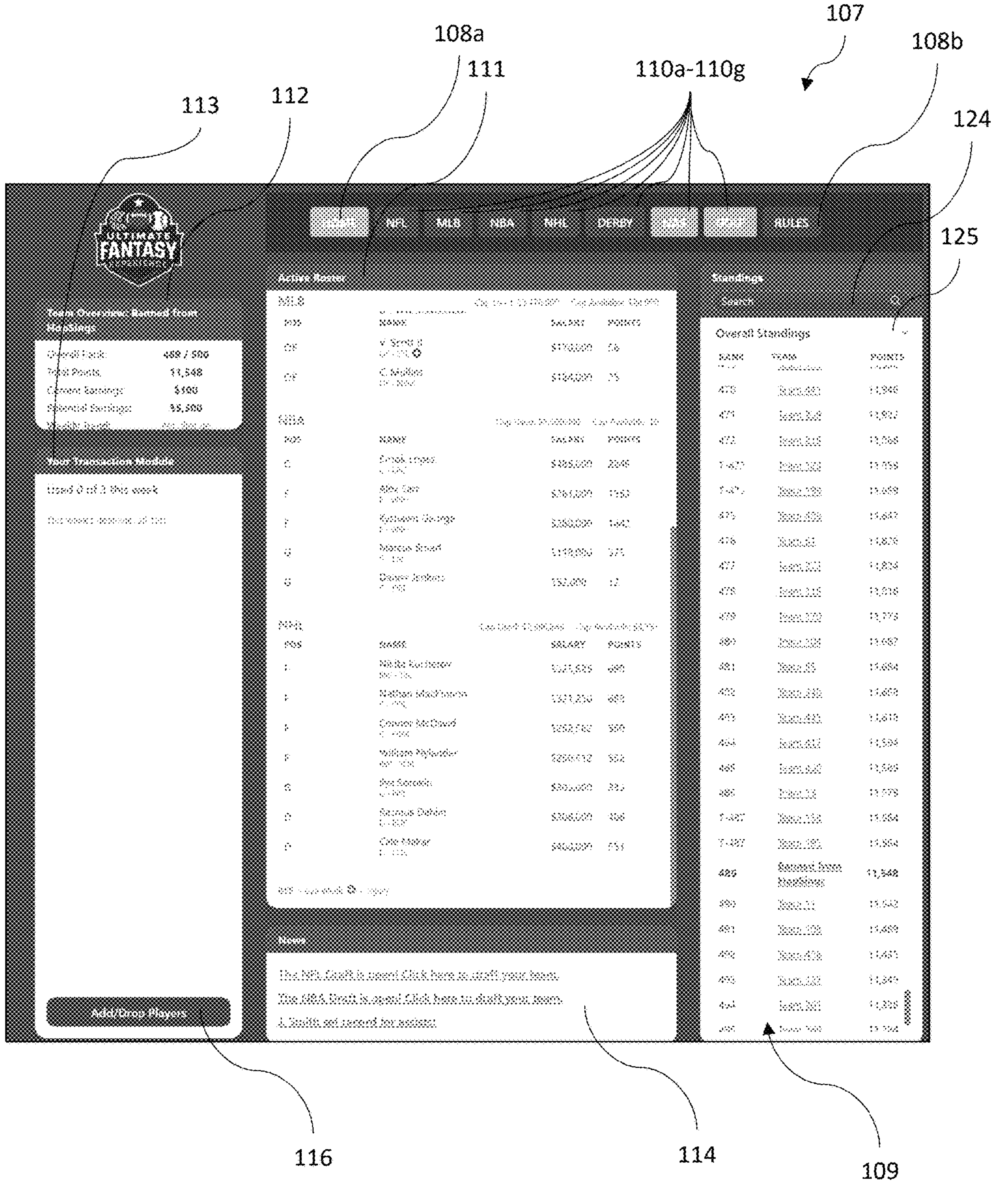
Figure 2C:
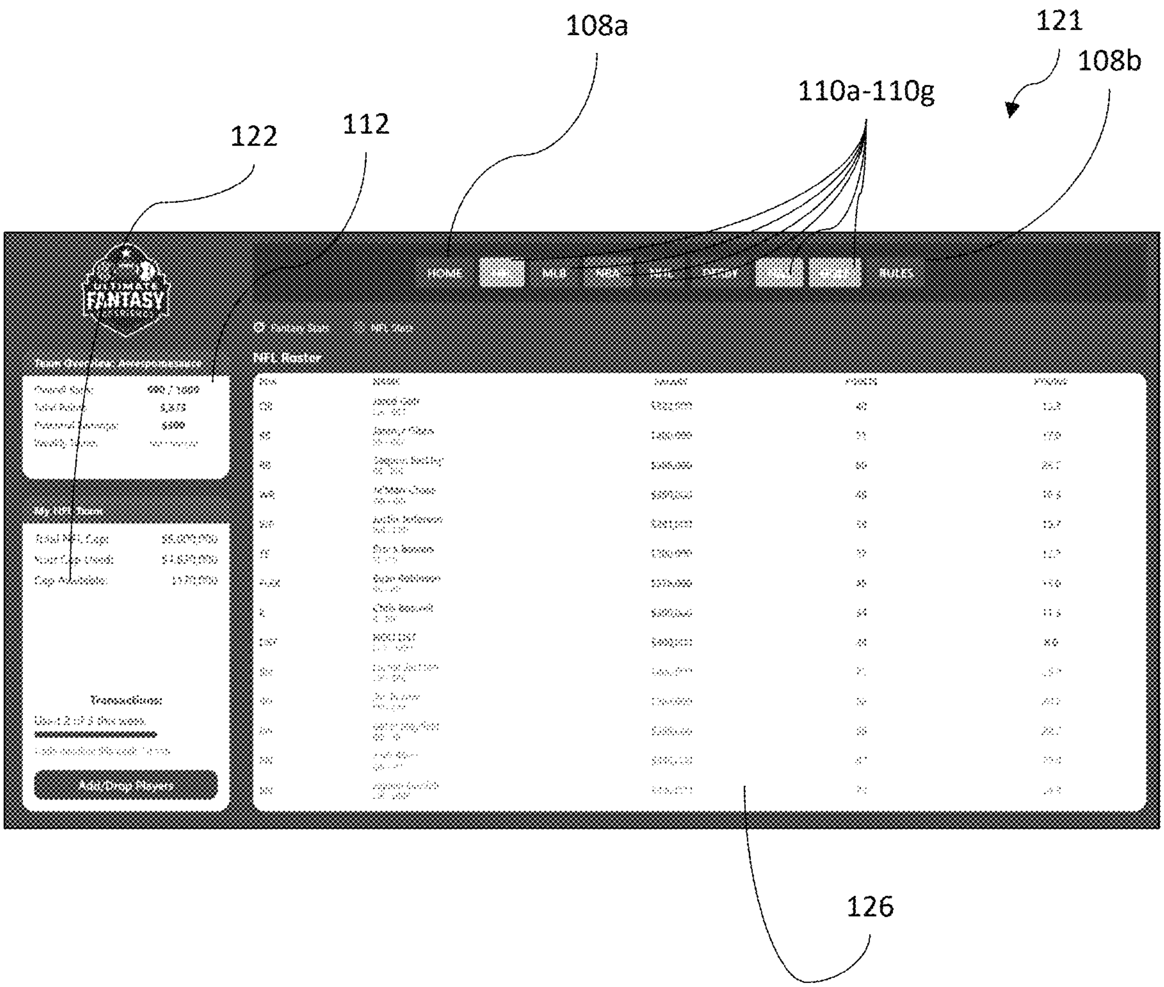
Figure 2D:
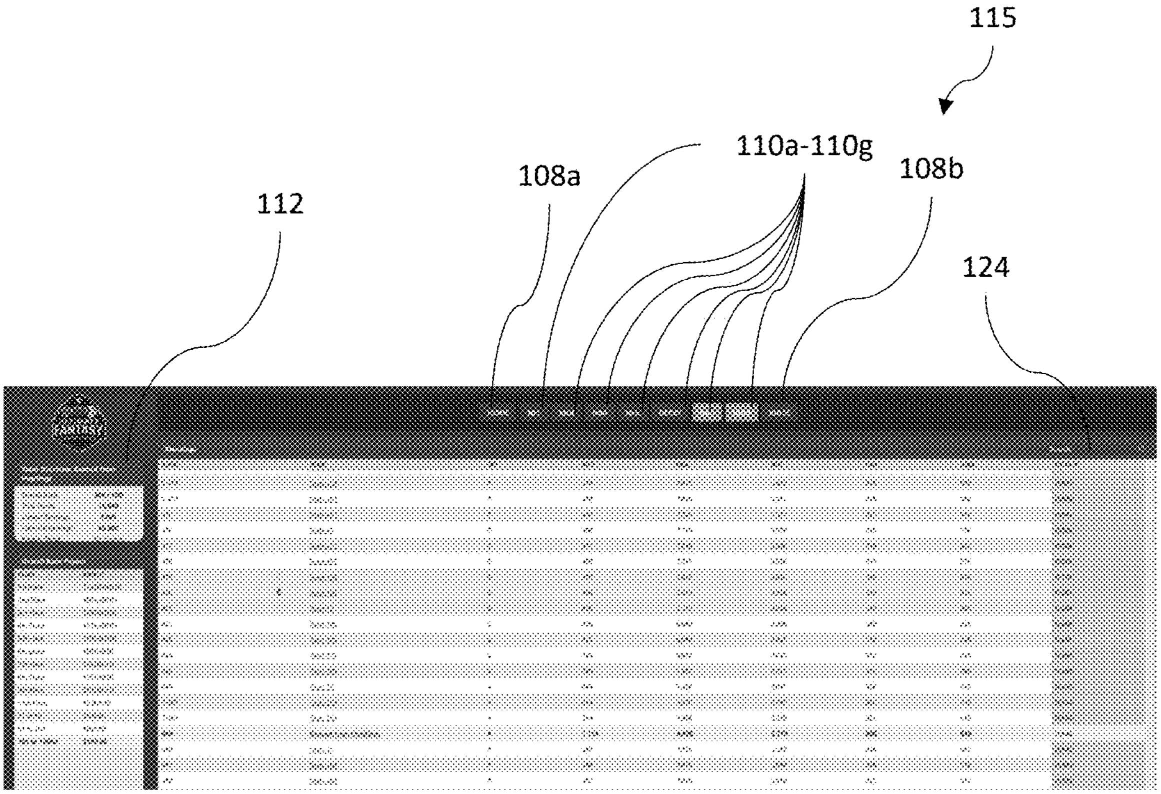
Figure 2E:
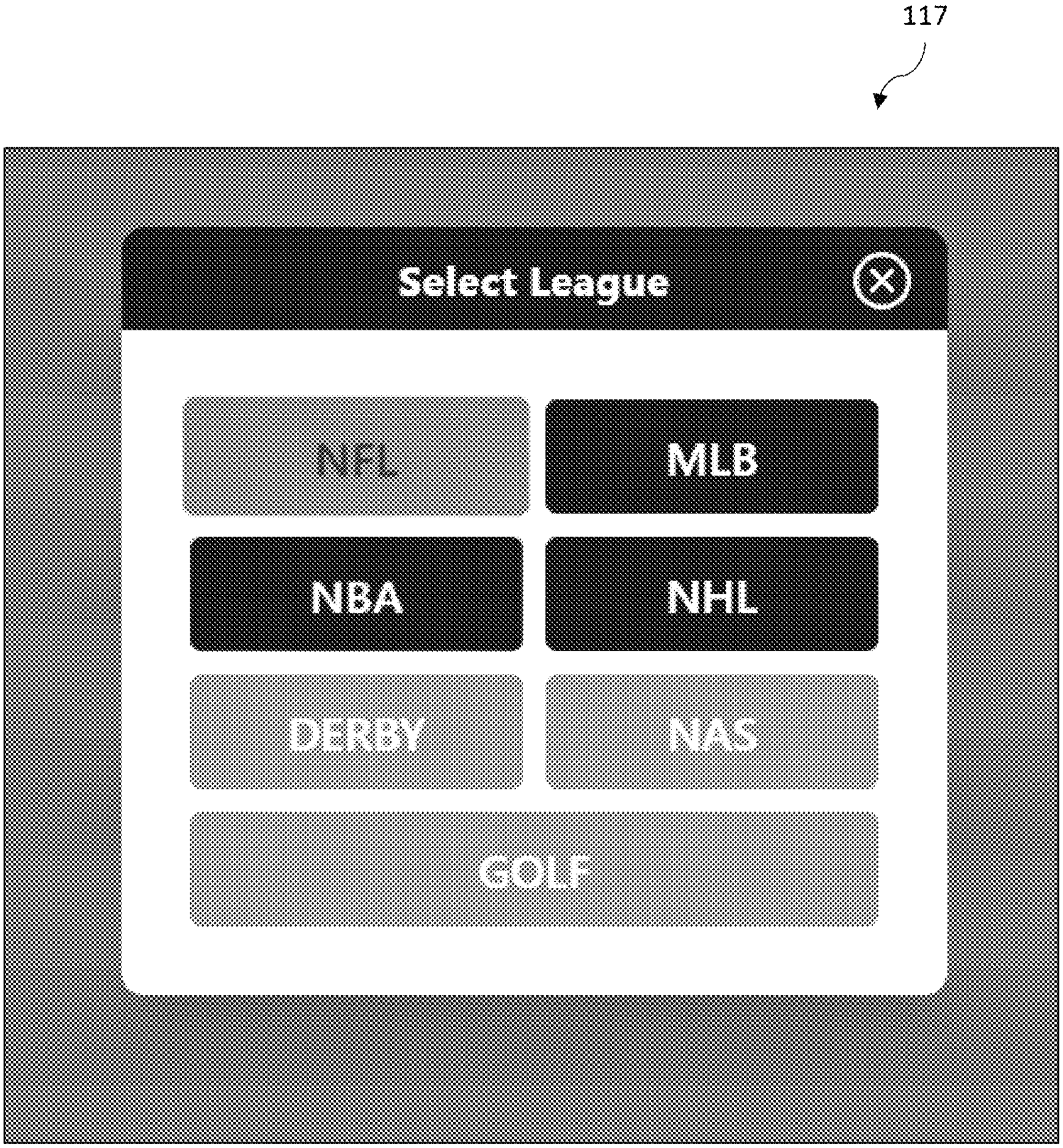
Figure 2F:
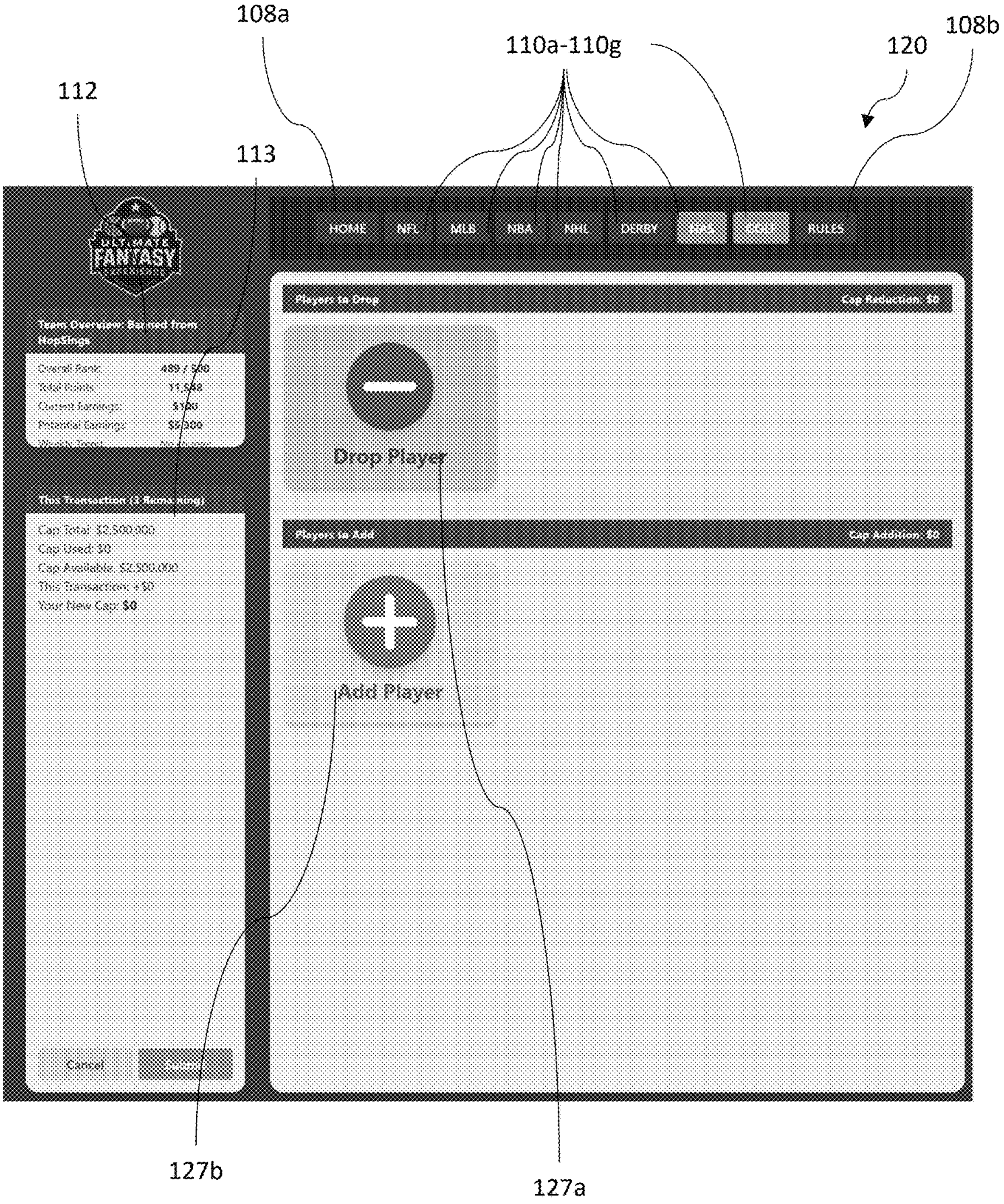
Figure 2G:
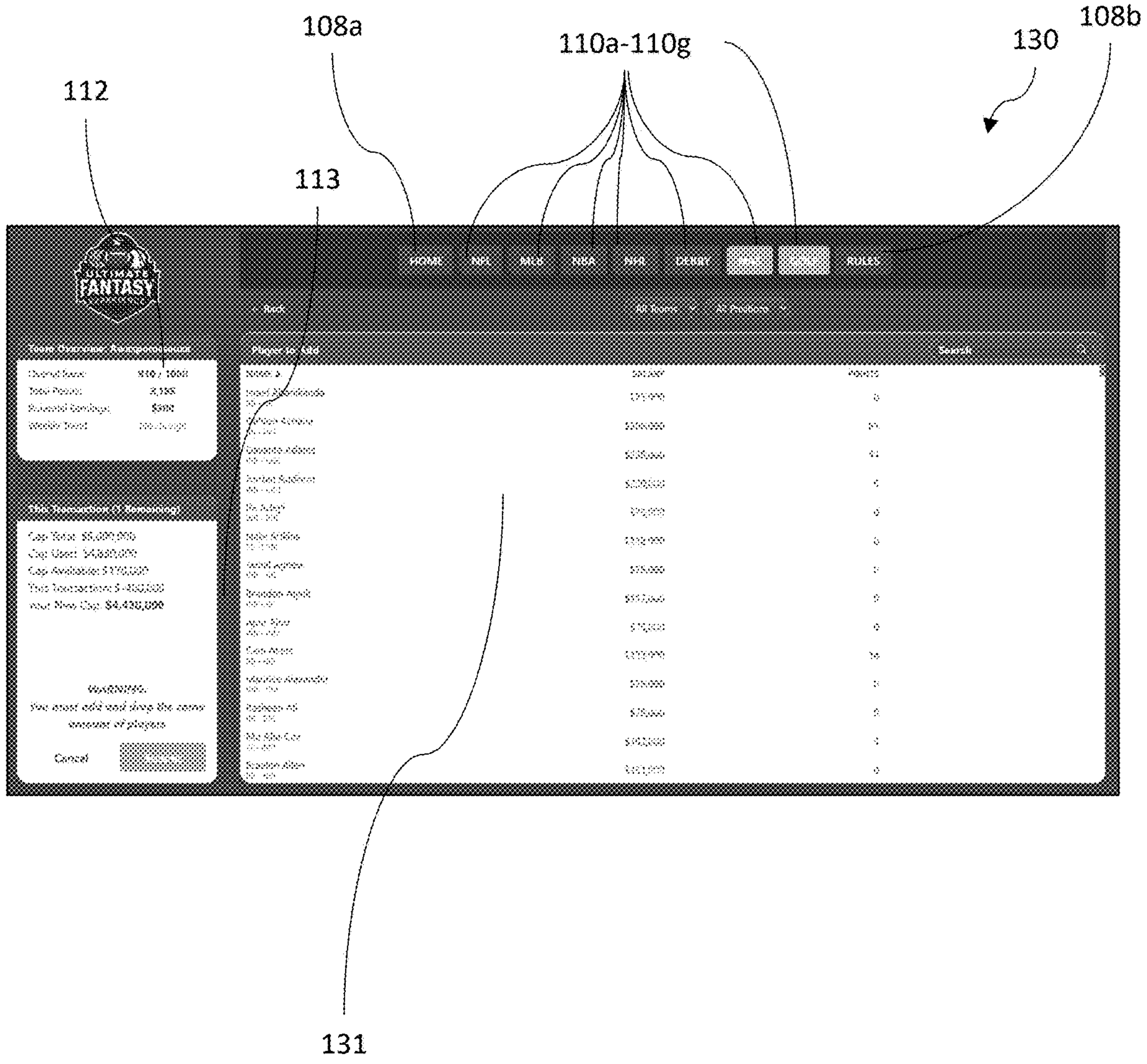
Figure 2H:
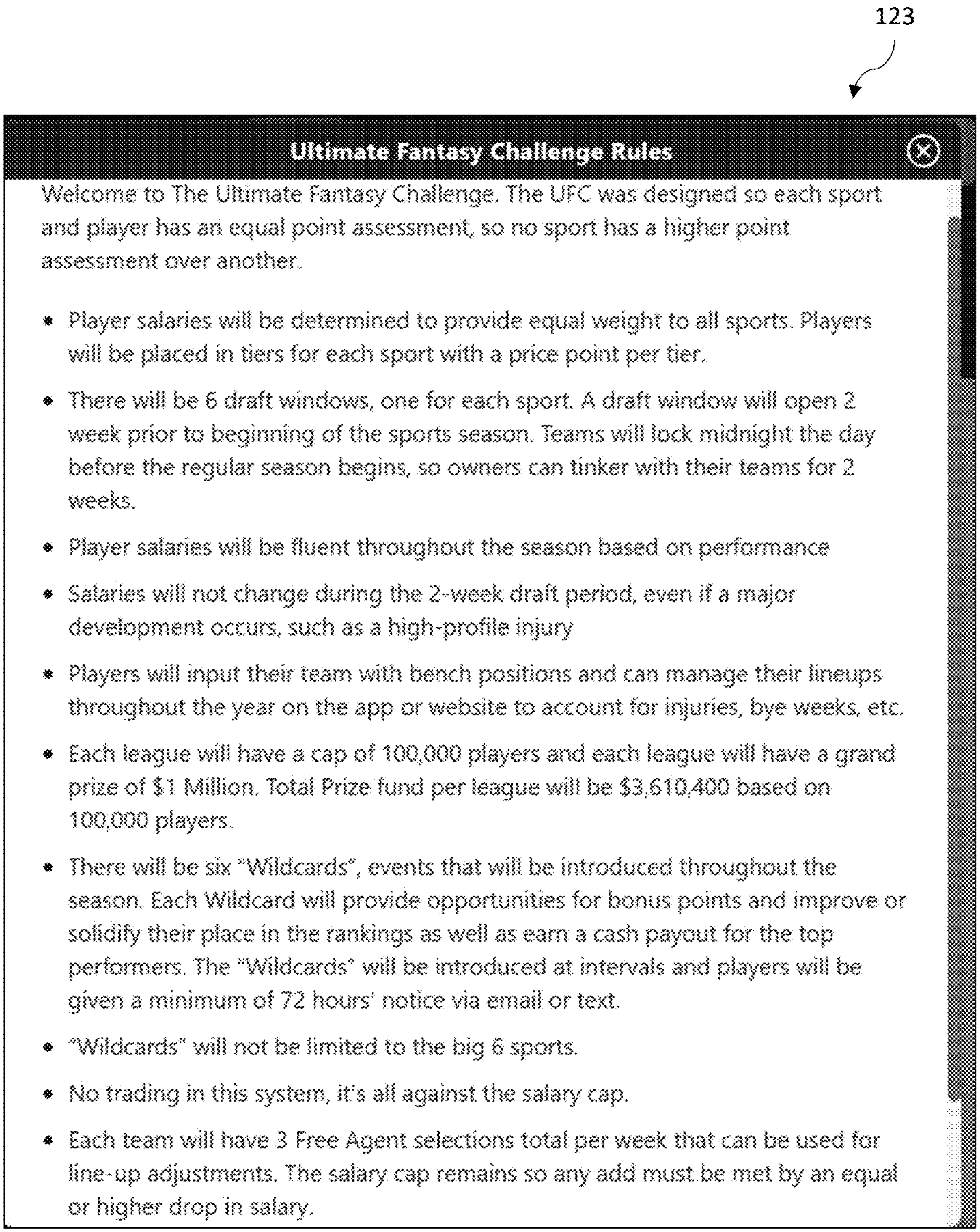

Referring initially to FIG. 1, a system 100 according to the present disclosure is now described. The system 100 illustratively includes a computing device 101 (i.e., a server), and a plurality of user devices 102*a*-102*n* (e.g., mobile devices, tablet computing devices, personal computing devices, etc.) communicating over a network (e.g., illustrated Internet 103) and with a corresponding plurality of users 104*a*-104*n* associated therewith. The computing device 101 illustratively comprises a memory 105 and a processor 106 cooperating with the memory. As will be appreciated, the computing device 101 may comprise a standalone computing device or provisioned resources within a cloud computing platform (e.g., Amazon Web Services, Microsoft Azure, Google Cloud Platform).

The system 100 illustratively provides an online fantasy sports game for the plurality of users 104a-104n. In particular, the processor 106 is configured to provide a gaming UI for the plurality of users 104a-104n to play and control the online fantasy sports game. In the illustrated embodiment, the gaming UI is provided within a web browser interface. In other embodiments, the gaming UI may be provided via a native software application within a respective operating system of the plurality of user devices 102a-102n.

Referring now additionally to FIGS. 2A-2H, the online fantasy sports game operates based upon a plurality of sports. In particular, as shown in the homepage UI 107, the homepage UI 107 illustratively includes a plurality of sports tabs 110a-110g respectively accessing the plurality of sports including professional American football, professional basketball, professional baseball, professional golf, professional soccer, horse racing, and professional hockey. Of course, this listing is not exhaustive and merely exemplary, and additional sports may be added or swapped out, including professional motorsports, international and collegiate sports, for example. The homepage UI 107 illustratively comprises a standings panel 109 for showing a current rankings for the plurality of user 104a-104n. The standings panel 109 illustratively comprises a search field 124 for searching for specific team/user results, and a fly down menu 125 for accessing different standings (e.g., sport specific standings and overall standings).

In the illustrative example, the given user 104a-104n may select from at least three sports. Of course, in other embodiments, the online fantasy sports game may include more than three sports at the same time.

The processor 106 is configured to receive respective game instructions from each user 104a-104n for each of the plurality of sports. As will be appreciated, in the exemplary application of online fantasy sports, the game instructions comprise a roster of players comprising a required starting roster and remaining bench players. The homepage UI 107 illustratively comprises an active roster panel 111 for showing a current roster for the given user 104a-104n for the online fantasy sports game. Here, the user 104a-104n has selected players from several sports comprising professional hockey, professional basketball, and professional baseball.

The homepage UI 107 illustratively comprises a home tab 108a, and a rules tab 108b. These tabs a persistent in the gaming UI and aid in navigation. When the user 104a-104n selects the home tab 108a, the gaming UI switches to the homepage UI 107 regardless of the current UI state. When the user 104a-104n selects the rules tab 108b, the gaming UI switches to a rules pop up window 123 regardless of the current UI state. The illustrated rules are exemplary and comprise the following: 1. Player salaries will be determined to provide equal weight to all sports. Players will be placed in tiers for each sport with a price point per tier. 2. There will be 6 draft windows, one for each sport. A draft window will open 2 weeks prior to beginning of the sports season. Teams will lock midnight the day before the regular season begins, so owners can tinker with their teams for 2 weeks. 3. Player salaries will be fluent throughout the season based on performance. 4. Salaries will not change during the 2-week draft period, even if a major development occurs, such as a high-profile injury. 5. Players will input their team with bench positions and can manage their lineups throughout the year on the app or website to account for injuries, bye weeks, etc. 6. Each league will have a cap of 100,000 players and each league will have a grand prize of $1 Million. Total Prize fund per league will be $3,610,400 based on 100,000 players. 7. There will be six "Wildcards", events that will be introduced throughout the season. Each Wildcard will provide opportunities for bonus points and improve or solidify their place in the rankings as well as earn a cash payout for the top performers. The "Wildcards" will be introduced at intervals and players will be given a minimum of 72 hours notice via email or text. 8. "Wildcards" will not be limited to the big 6 sports. 9. No trading in this system, it's all against the salary cap. 10. Each team will have 3 Free Agent selections total per week that can be used for line-up adjustments. The salary cap remains so any add must be met by an equal or higher drop in salary.

When the user 104a-104n selects of the plurality of sports tabs 110a-110g, the gaming UI switches from the homepage UI 107 to a sport specific roster UI 121. The sport specific roster UI 121 illustratively includes a team overview panel 112 showing a given user's team statistics, a sport specific team panel 122 showing cap statistics for the associated sport, and a sport specific roster 126 for the given user 104a-104n.

In the illustrated embodiment, the selection of the roster for each sport is based upon a sport specific draft that occurs before the start of the season. Further, this is based upon an auction draft format. As will be appreciated, the auction draft format includes a capped amount of spending resources (e.g., illustrated dollars) for competitive reasons. Of course, other draft formats may be used in other embodiments. Further, in some embodiments, the daily fantasy format may be used where the given user 104a-104n would select a roster more frequently, such as a weekly format, for example.

The homepage UI 107 illustratively comprises a team overview panel 112 showing a given user's team statistics, and a transactions panel 113 showing recent transactions by the given user 104a-104n. In the illustrated embodiment, the given user 104a-104n is limited to a threshold amount of transactions per week (e.g., the illustrated three). The homepage UI 107 illustratively comprises a news panel 114 showing latest news relevant to the plurality of sports. When the standings panel 109 is selected, the gaming UI switches from the homepage UI 107 to the standings page UI 115, which shows a comprehensive standings breakdown.

When the user selects the add/drop players button 116 in the transactions panel 113, the gaming UI switches from the homepage UI 107 to sport selection window 117, which permits the given user to select a given sport for adjusting a respective roster. Once the given user 104a-104n selects a sport, the gaming UI switches to a roster modification UI 120, which includes an add feature 127a and a drop feature 127b. Here, the given user 104a-104n may add/drop specific players from differing sports from the active roster. Once the given user 104a-104n selects either the add feature 127a or the drop feature 127b, the gaming UI switches to a player selection UI 130, which illustratively includes a player selection panel 131 with available players for the desired action.

In some embodiments, the processor 106 is configured to provide each user 104a-104n with an offer to add one or more wildcard gaming events into the online fantasy sports game. For example, the wildcard gaming event may comprise a one-off event, such as a boxing match, a specific horse race, or a special event. An exemplary list of the wildcard gaming events may comprise FIFA Soccer World Cup, Summer and Winter Olympic Events, Super Bowl Prop Bets, Wimbledon, Kentucky Derby, Preakness, Belmont Stakes, Cricket World Cup, The Masters, Tour de France, UEFA Champions League Final, UFC Fights/Cards, NCAA Basketball, Monaco Grand Prix, Daytona 500, College Football Playoffs, Rugby World Cup, Indianapolis 500, The Ryder Cup, and Picks of MVPs for all Major Sports.

If the given user 104*a*-104*n* elects to add the wildcard gaming event and provides game instructions (i.e., adding players or picking a winner), the online fantasy sports game will now incorporate the wildcard gaming event within the online fantasy sports game. To keep competition fair, the processor 106 is configured to permit the user 104*a*-104*n* to add only within a threshold amount of wildcard gaming events (e.g., 1-3 wildcard gaming events). The processor 106 may be configured to receive geolocation data from each user 104*a*-104*n* via the geolocation features of the respective user device 102*a*-102*n*. Here, the one or more wildcard gaming events may be geographically targeted based upon the geolocation data. For example, the one or more wildcard gaming events may comprise events within a linear radius (e.g., 50 miles) of the geolocation data. In other words, each user 104*a*-104*n* may be offered local geographic events to increase engagement.

In some embodiments, the offer for the wildcard gaming event also requires a wager amount from the given user 104*a*-104*n*. In particular, the game instructions would include the player/winner and a wager of points accumulated so far in the game (i.e., final Jeopardy rules). If the user 104*a*-104*n* loses the wildcard gaming event, the wagered points are deducted from the accumulated point total, and if the user wins the wildcard gaming event, the wagered points are added to the accumulated point total.

To enhance user engagement with the gaming UI, the wildcard gaming events may be randomly offered, and programmed to expire after a set time period. For mobile device applications, these wildcard gaming event offers may be pushed to the user via a notification panel of the mobile operating system. Because of this, the given user 104*a*-104*n* would be encouraged to visit the gaming UI on a regular basis, which may lead to increased engagement and advertisement revenue. Further, if the given user 104*a*-104*n* wins the wildcard gaming event, the processor 106 is configured to generate reminder notifications regarding the past win to further encourage the user to engage with the gaming UI.

The processor 106 is also configured to generate an aggregate score for each user 104*a*-104*n* based upon the respective game instructions and associated actual performance of the user roster in the plurality of sports. As will be appreciated, the aggregate score comprises a calculation of respective performance for each player on a roster, which comprises performance across multiple sports. The scoring algorithm is configured to balance scoring weights between sports. In particular, some sports with more games, such as professional baseball, may need to be weighted down to be equivalent with sports with fewer games, such as professional American football. The goal of the scoring algorithm is to weight scoring outputs for different players in different sports to have equivalent seasonal output. For example, professional baseball has many more games than professional football, so then scoring algorithm needs to balance the weighting so that players from each sports have near equivalent season averages.

To further enhance engagement, the processor 106 may be configured to provide each user 104*a*-104*n* with the offer to add an additional wildcard gaming event when a current aggregate score for a given user is below a threshold value. In short, this feature specifically engages with users 104*a*-104*n* who have a low chance of winning the online fantasy sports game. This feature may reduce the chances of these users from quitting on the online fantasy sports game, again improving user engagement.

The processor 106 is configured to determine a winner of the online fantasy sports game from the plurality of users 104*a*-104*n* and based upon the aggregate scores of the plurality of users. Of course, this aggregate score is based upon performance in all of the plurality of sports, but in some embodiments, the processor 106 is configured to provide sport specific rankings and to determine sport specific winners. In essence, this processor would generate the runner ups for each sport. This may also increase user engagement since high performance in a single sport may generate some winnings.

In some embodiments, the plurality of users 104*a*-104*n* may form groups for separate competition (i.e., fantasy sports league). In addition to the overall standings, one or both of the standings panel 109 and the standings page UI 115 may show the group based standings along with the overall standings.

Regarding fee generation, in one example embodiment, each user 104*a*-104*n* would need to pay a single entrance fee for the online fantasy sports game. This entrance fee would cover the entire gameplay, including the one or more wildcard gaming events. In some embodiments, the given user 104*a*-104*n* could buy-in into additional wildcard gaming events for an additional fee. In essence, this would be the equivalent of a "poker rebuy", permitting the given user 104*a*-104*n* to buy more points in the aggregate score.

In some embodiments, typical sports betting may be integrated within the gaming UI. For example, when selecting a winner for a wildcard gaming event, the gaming UI may present current odds for the selected outcome and invite the given user 104*a*-104*n* to make a traditional wager on the outcome.

Another aspect is directed to a computer implemented method for providing an online fantasy sports game for a plurality of users 104*a*-104*n*. The method comprises providing a gaming UI for the plurality of users 104*a*-104*n* to play the online fantasy sports game, the online fantasy sports game operating based upon a plurality of sports, and receiving respective game instructions from each user for each of the plurality of sports. The method also includes generating an aggregate score for each user 104*a*-104*n* based upon the respective game instructions and associated actual performance in the plurality of sports, and determining a winner of the online fantasy sports game from the plurality of users and based upon the aggregate scores of the plurality of users.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A computing device for providing an online fantasy sports game for a plurality of users to play respectively on a plurality of user devices, the computing device comprising:

a processor and memory cooperating therewith and configured to:

provide a gaming user interface (UI) within a mobile operating system of the plurality of user devices for the plurality of users to play the online fantasy sports game, the online fantasy sports game operating based upon a plurality of sports, receive respective game instructions, via the gaming UI and using the plurality of user devices, from each of the plurality of users for each of the plurality of sports, receive geolocation data from geolocation features in the plurality of user devices respectively for the plurality of users, the plurality of user devices providing geolocation data for respective users, push, via a notification panel of the mobile operating system of the plurality of user devices, to each of the plurality of users an offer to add at least one wildcard gaming event into the online fantasy sports game when the geolocation data for each of the plurality of users is within a threshold distance of the at least one wildcard gaming event, randomly provide each of the plurality of users with the offer to add at least one wildcard gaming event into the online fantasy sports game, and programmed to expire after a set period of time, generate an aggregate score for each of the plurality of users based upon the respective game instructions and associated actual performance in the plurality of sports and the at least one wildcard gaming event, and determine a winner of the online fantasy sports game from the plurality of users and based upon the aggregate scores of the plurality of users.

2. The computing device of claim 1 wherein the at least one wildcard gaming event comprises a one-off gaming event.

3. The computing device of claim 1 wherein the processor is configured to, for the offer, receive an associated wildcard risk wager from a current aggregate score for a given user.

4. The computing device of claim 1 wherein the processor is configured to provide each of the plurality of users with the offer to add an additional wildcard gaming event when a current aggregate score for a given user is below a threshold value.

5. The computing device of claim 1 wherein the processor is configured to provide each of the plurality of users with the offer to add an additional wildcard gaming event based upon an additional fee from a given user.

6. The computing device of claim 1 wherein the respective game instructions comprise respective rosters for each of the plurality of sports.

7. The computing device of claim 1 wherein the processor is configured to generate a plurality of draft events respectively for the plurality of sports, the plurality of draft events to determine rosters for each of the plurality of users.

8. The computing device of claim 1 wherein the plurality of sports comprises professional American football, soccer, professional basketball, professional baseball, horse racing, professional golf, and professional hockey.

9. A computer implemented method for providing an online fantasy sports game for a plurality of users, the method comprising:

providing a gaming user interface (UI) within a mobile operating system of a plurality of user devices for the plurality of users to play the online fantasy sports game, the online fantasy sports game operating based upon a plurality of sports;

receiving respective game instructions, via the gaming UI and using the plurality of user devices, from each of the plurality of users for each of the plurality of sports;

receiving geolocation data from geolocation features in the plurality of user devices respectively for the plurality of users, the plurality of user devices providing geolocation data for respective users;

via a notification panel of the mobile operating system of the plurality of user devices, pushing to each of the plurality of users an offer to add at least one wildcard gaming event into the online fantasy sports game when the geolocation data for each of the plurality of users is within a threshold distance of the at least one wildcard gaming event;

randomly providing each of the plurality of users with the offer to add at least one wildcard gaming event into the online fantasy sports game, the offer programmed to expire after a set period of time;

generating an aggregate score for each of the plurality of users based upon the respective game instructions and associated actual performance in the plurality of sports and the at least one wildcard gaming event; and determining a winner of the online fantasy sports game from the plurality of users and based upon the aggregate scores of the plurality of users.

10. The computer implemented method of claim 9 wherein the at least one wildcard gaming event comprises a one-off gaming event.

11. The computer implemented method of claim 9 further comprising, for the offer, receiving an associated wildcard risk wager from a current aggregate score for a given user.

12. The computer implemented method of claim 9 further comprising providing each of the plurality of users with the offer to add an additional wildcard gaming event when a current aggregate score for a given user is below a threshold value.

13. A computing system for providing an online fantasy sports game for a plurality of users to play, the computing system comprising:

a plurality of user devices respectively associated with the plurality of users; and a server in communication with the plurality of user devices, the server comprising a processor and memory cooperating therewith and configured to:

provide a gaming user interface (UI) within a mobile operating system of the plurality of user devices for the plurality of users to play the online fantasy sports game, the online fantasy sports game operating based upon a plurality of sports;

receive respective game instructions, via the gaming UI and using the plurality of user devices, from each of the plurality of users for each of the plurality of sports;

receive geolocation data from geolocation features in the plurality of user devices respectively for the plurality of users, the plurality of user devices providing geolocation data for respective users;

via a notification panel of the mobile operating system of the plurality of user devices, push to each of the plurality of users an offer to add at least one wildcard gaming event into the online fantasy sports game when the geolocation data for each of the plurality of users is within a threshold distance of the at least one wildcard gaming event;

randomly provide each of the plurality of users with the offer to add at least one wildcard gaming event into the online fantasy sports game, the offer programmed to expire after a set period of time;

generate an aggregate score for each of the plurality of users based upon the respective game instructions and associated actual performance in the plurality of sports and the at least one wildcard gaming event; and determine a winner of the online fantasy sports game from the plurality of users and based upon the aggregate scores of the plurality of users.

14. The computing system of claim 13 wherein the at least one wildcard gaming event comprises a one-off gaming event.

15. The computing system of claim 13 wherein the processor is configured to, for the offer, receive an associated wildcard risk wager from a current aggregate score for a given user.

16. The computing system of claim 13 wherein the processor is configured to provide each of the plurality of users with the offer to add an additional wildcard gaming event when a current aggregate score for a given user is below a threshold value.

* * * * *